United States Patent [19]
Menichelli

[11] Patent Number: 6,046,625
[45] Date of Patent: *Apr. 4, 2000

[54] HIGH CURRENT CMOS CHARGE, PARTICULARLY FOR FLASH EEPROM MEMORIES

[75] Inventor: Stefano Menichelli, Avezzano, Italy

[73] Assignee: Texas Instruments Incorporated, Dallas, Tex.

[ * ] Notice: This patent is subject to a terminal disclaimer.

[21] Appl. No.: 08/993,102

[22] Filed: Dec. 18, 1997

[30] Foreign Application Priority Data

Dec. 23, 1996 [IT] Italy ................................ RM96A0898

[51] Int. Cl.[7] ........................................................ G05F 1/10
[52] U.S. Cl. .............................................. 327/536; 363/60
[58] Field of Search .................................. 327/536, 537, 327/535, 538, 540, 543; 363/59, 60

[56] References Cited

U.S. PATENT DOCUMENTS

| | | | |
|---|---|---|---|
| 5,168,174 | 12/1992 | Naso | 307/296.6 |
| 5,301,097 | 4/1994 | McDaniel | 363/60 |
| 5,414,614 | 5/1995 | Fette | 363/59 |
| 5,748,032 | 5/1998 | Baek | 327/536 |
| 5,754,476 | 5/1998 | Caser et al. | 327/536 |
| 5,821,805 | 10/1998 | Jinbo | 327/536 |
| 5,856,918 | 1/1999 | Soneda et al. | 363/60 |

FOREIGN PATENT DOCUMENTS 0 720 170 A2  3/1996  Italy .

*Primary Examiner*—Timothy P. Callahan
*Assistant Examiner*—Jung Ho Kim
*Attorney, Agent, or Firm*—Bret J. Petersen; Richard L. Donaldson

[57] ABSTRACT

A voltage multiplier circuit or charge pump circuit for CMOS integrated circuits having high power efficiency, high current drive and efficient area utilization. An embodiment comprises two mirrored sections driven by control signals (PH00, PH01, PH0_P; PH10, PH11, PH1_P) generated by a logic circuitry which receives, as input signals, an enable signal (en) and a clock signal (clk), wherein each mirrored section includes N stages and each stage comprises a capacitor (C00, C01, C02; C10, C11, C12) having a lower terminal and an upper terminal, the lower terminal is connected to a first switch (INV0, NCH00, NCH01; INV1, NCH10, NCH11) that, in closed condition, couples the lower terminal of the capacitor to ground (GND), said lower terminal of the capacitor being additionally connected to a second switch (INV0, PCH00, PCH01; INV1, PCH10, PCH11) that, in closed condition, couples the lower terminal of the capacitor to the supply voltage (Vpp).

17 Claims, 2 Drawing Sheets

HIGH CURRENT CMOS CHARGE, PARTICULARLY FOR FLASH EEPROM MEMORIES

This invention broadly relates to semiconductor memories and more particularly concerns a novel implementation of a voltage multiplier circuit that enables integrated circuits manufactured in CMOS technology to be operated under a standard supply voltage of 3.3 volts or 5.0 volts also in those cases in which higher voltages are required, generated within the circuit itself and in certain operation circumstances.

It is known, for instance, that, in EEPROM memories, besides the standard supply voltages of 5.0 or 3.3 volts, also higher voltages are utilised, for instance 12 volts or in other operation circumstances also 18 volts, in order to carry out programming operations of the memory cells or erasure operations. It is generally known that these memory devices require an additional supply arrangement, which entails some problems, due to the fact that obviously the need that two supply arrangements be provided rather than just one clearly cannot be considered as an advantage. The problem exists that a voltage higher than the supply voltage is to be provided on the same chip.

On-chip voltage multipliers, often referred to as "charge pumps", are typically utilised in order to enable integrated circuits to be operated from the standard power supply, although, as it occurs in Flash EEPROM memories, in certain operation modes, negative voltages and/or positive voltages higher than the standard power supply voltages are internally required.

As it is known to those skilled in the art, one of the issues to be always carefully kept into account in designing and implementing an integrated circuit is the utilisation grade of the area of the silicon chip on which the integrated circuit is realised. From this view point, therefore, it should be kept into account that the silicon area needed to implement a charge pump circuit can noticeably vary depending on three primary factors: the power supply voltage, the output requirements and the capacitance per unit area of the on-chip capacitors that are realised.

As a citation of the prior art, reference can be made to FIG. 1 which illustrates a schematically depicted conventional charge pump circuit. As it can be observed, it substantially includes a diode chain $D_1$, $D_2$, ... $D_{N-1}$, $D_N$ plus an output diode $D_{OUT}$ supplied by a supply voltage Vpp. The alternate nodes between the diodes of the chain are coupled to two clock signals PH and PH__ through capacitors $C_1$, $C_3$ ... $C_{N-1}$ and $C_2$, $C_4$ ... $C_N$, respectively.

In this circuit, the charge packets are "pumped" along the chain diodes according to the charging and discharging steps of the coupling diodes under the alternated actions of the above mentioned two clock signals PH and PH__, which are of opposite phases, with amplitude Vpp.

As it is known, in CMOS technology, diodes are not available and the ones in the circuit of FIG. 1 are typically replaced by NMOS or bipolar NPN transistors designed to operate as diodes. Although bipolar transistors are not standard devices in CMOS technology, some CMOS processes can include a set of steps that, even if designed and optimised in respect of other objects to be reached, can be "unproperly" but conveniently utilised to obtain bipolar transistors. It is clearly understood that any bipolar transistors obtained in this manner are not optimised and that their utilisation is subject to many restrictions. In particular, they typically have a high collector resistance which is often associated with an undesired parasitic PNP transistor and jeopardises their capability to effectively perform their operation as diodes at intermediate or high current values.

The performances of the circuit of FIG. 1 are strictly correlated with the diode efficiency and with the power supply voltage. In standard CMOS technology, due to the voltage drop across the devices employed as diodes and due to inefficiency in handling high currents, the charge pump of FIG. 1 exhibits, especially at low power supply voltages, a poor performance, in terms of both a voltage multiplication efficiency and a current drive capability. This practically occurs because, in a voltage multiplier circuit, high voltage MOS transistors are typically used. But it is known that high voltage MOS transistors have a very scarce capability to efficiently perform their desired diode function due to the high $V_T$ value and to the low $K_P$ value with respect to low voltage MOS transistors.

Furthermore, the output voltage tends to collapse when the output current increases above the maximum allowable value. Lastly, it should be noted that, in the concerned circuit, the capacitors have to stand subjected to high voltages across themselves and this is a drawback in terms of silicon area usage, as it will be subsequently described when the capacitance per unit area will be discussed with respect to the dielectric oxide layer thickness.

In view of this prior art, it is a broad object of this invention to realise a charge pump circuit, implemented in CMOS technology, adapted to generate on-chip very high positive voltages, without the drawbacks and the complexities of the prior art approaches.

A further object of this invention is to realise a charge pump circuit as above said, which is also very flexible, as well as easily modifiable in order to fulfil any different and specific application requirements.

Additional objects of this invention are to realise a charge pump circuit as above said having a very high current drive capability, a very high efficiency in terms of power, as well as an efficient silicon area utilisation.

The above mentioned objects are obtained by means of a voltage multiplier circuit for integrated circuits, comprising two mirrored sections driven by control signals generated by a logic circuitry which receives, as input signals, an enable signal and a clock signal, wherein each mirrored section includes N stages and each stage comprises a capacitor having a lower terminal and an upper terminal, the lower terminal is connected to a first switch that, in closed condition, couples the lower terminal of the capacitor to ground, said lower terminal of the capacitor being additionally connected to a second two-terminal switch that, in closed condition, couples the lower terminal of the capacitor to the power supply voltage, as far as the first stage is concerned, or to the upper terminal of the capacitor of the previous stage, the upper terminal of the capacitor is connected to a third switch that, in closed condition, couples the upper terminal of the capacitor to the supply voltage, the upper terminal of the capacitor of the last-but-one stage is connected to a last two-terminal switch that, in closed condition, couples the upper terminal of the capacitor of the last-but-one stage to the output of the voltage multiplier; said control signals directly or indirectly drive said switches such that, when the voltage multiplier is enabled, at a rate determined by said clock signal, each mirrored section in alternating times is switched over from a charging phase to a discharging phase, so that while a mirrored section is in charging phase, the other one is in discharging phase and vice versa; when a mirrored section of the circuit is in charging phase, the last switch and all second switches thereof are in open condition, while its first and its third switches are in closed condition, so that all capacitors of this circuit section are parallel connected between the supply voltage and ground and are charged up to said power supply voltage; when a mirrored section of the circuit is in discharging phase, all its first and third switches are in open condition, while its last switch and all its second switches are in closed condition, so that all capacitors are serially connected with one another, the lower terminal of the capacitor of the first stage being connected to the power supply voltage and the upper terminal of the capacitor of the last-but-one stage being connected to the output of the voltage multiplier; when the voltage multiplier is disabled, both mirrored sections of the circuit are in charging phase.

In the above set forth circuit, said two mirrored circuit sections are driven by a first and a second control signals, having opposite polarities; when the mirrored section is in charging phase, said first control signal is at ground, while said second control signal is at the power supply voltage; when the mirrored section is in discharging phase, said first control signal is at the power supply voltage, while said second control signal is at ground.

In the preferred embodiment, the first and the second switches of the first stage of each mirrored section are realised by means of conventional CMOS inverters so that said first switch is realised by means of a N-channel MOS transistor, having the source region connected to ground, the drain region connected to the lower terminal of the first stage capacitor and the gate region connected to the line of said second control signal, said second switch is realised by a P-channel MOS transistor having the source region and the N-well in which the transistor is realised connected to the power supply voltage, the drain region connected to the lower terminal of the first stage capacitor and the gate region connected to the line of said second control signal.

Furthermore, all said first switches, except for the ones of the first stage of both mirrored sections, are realised by means of N-channel MOS transistors having their source region connected to the line of said first control signal, their drain region connected to the lower terminal of the capacitor and their gate region connected to the power supply voltage.

Again in the preferred embodiment, all said second switches, except for the ones of the first stage of both mirrored sections, are realised by means of P-channel MOS transistors having their source region and the N-well, in which the transistor is realised, connected to the upper terminal of the capacitor of the previous stage, their drain region connected to the lower terminal of the capacitor of their own stage and their gate region connected to the line of said second control signal.

As it will be observed, said third switches of the circuit are realised by means of N-channel MOS transistors, having their source region connected to the upper terminal of the capacitor, their drain region connected to the power supply voltage and their gate region connected to the upper terminal of one of the capacitors of the other mirrored section of the circuit so as to enable a suitable voltage to be picked off from the discharging section for application to the gate region of said MOS transistors in order to turn them fully on when they emulate a closed switch.

Still in the preferred embodiment, each stage further includes a diode having its anode connected to the power supply voltage and its cathode connected to the upper terminal of the capacitor in order to guarantee pre-charging of the capacitors when the voltage multiplier is disabled, said third switches being in open condition due to the fact that they are realised by means of N-channel MOS transistors having their gate regions at a voltage not sufficient to turn them on because, since the voltage multiplier is disabled, both mirrored sections are in charging phase.

More particularly, said diodes are realised by means of N-channel MOS transistors, having their source region connected to the upper terminal of the capacitor and their drain and gate regions both connected to the power supply voltage.

In an embodiment, said last switch is realised by means of a NMOS transistor, having its gate region coupled to the upper terminal of the capacitor of the last stage, its drain region coupled to the upper terminal of the capacitor of the last-but-one stage and its source region coupled to the output of the voltage multiplier circuit.

In a preferred embodiment, said N-channel MOS transistors are of insulated type (iso-NMOS), having their deep N-well and insulated P-well regions short-circuited to each other and coupled to the lower terminal of the capacitor of the last-but-one stage.

Further details and advantages of this invention will be evident from the following specification by referring to the enclosed drawings wherein the preferred embodiment is shown by way of illustration and not by way of limitation.

IN THE DRAWINGS

Figure 2:
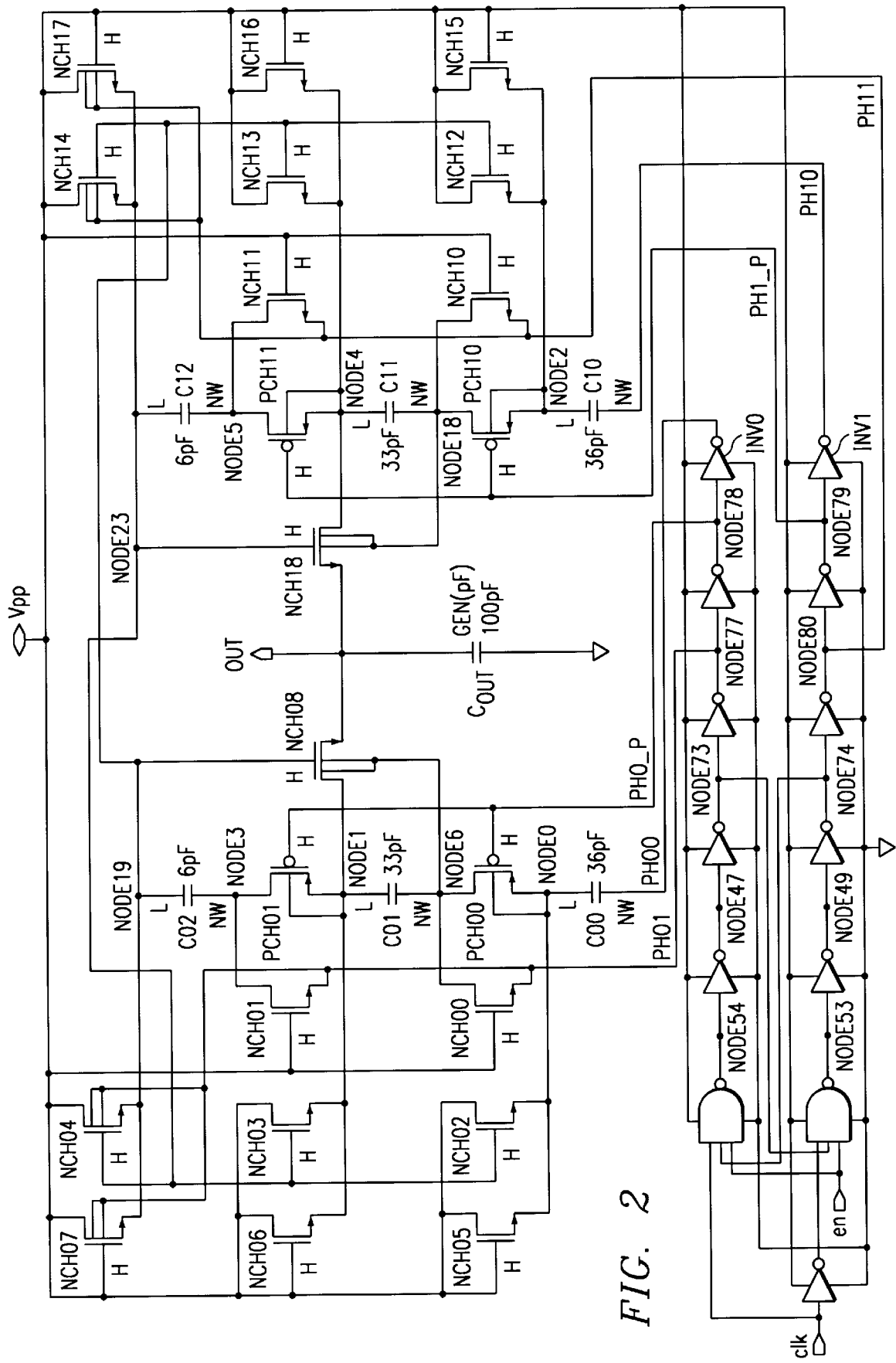
FIG. 2 shows a charge pump circuit of high voltage type according to this invention.

By referring now to FIG. 2, a novel voltage multiplier circuit is schematically shown, positively designed to furnish a great current drive capability as well as a high power efficiency.

The basic voltage multiplier structure is made of two mirrored parts which are clocked by not overlapping phases. The full symmetry of the circuit allows limiting the analysis to just one half of it and to refer to the other half circuit only to the necessary extent to explain all steps of the method. Each half section of the voltage multiplier comprises N stages: each stage is made of a capacitor and a few MOS transistors operating as switches. Said N capacitors are insulated from one another and charged in parallel to voltage Vpp during a phase of the clock signal, while, during the subsequent phase of the clock signal, said N capacitors are connected in series, to enable all of them but one to be directly discharged to the output. According to the clock signal, said N capacitors are insulated from each other and are connected together by means of PMOS transistors. During the charging phase, said N capacitors are insulated from each other and the two terminals of each capacitor are connected one to voltage Vpp and the other one to ground GND by means of NMOS transistors. During the discharging phase, said N capacitors are connected in series with the lower plate of the first stage capacitor coupled to voltage Vpp and the upper plate of the last-but-one stage capacitor coupled to the output through a NMOS transistor. The gate voltage of this NMOS transistor is furnished by the last stage, in the upper portion of the circuit, in order to drive the transistor in a fully on condition.

The charge pump circuit of FIG. 2 is particularly adapted for use in an embedded Flash EEPROM and it has been illustrated for the case N=3 and for providing an output current of several mA's.

The control signals are generated by logic gates that are shown in the bottom part of FIG. 2 and effectively form a not-overlapping phase generator.

In the circuit of FIG. 2, only high voltage MOS transistors are used, but the logic gates are realised by means of low voltage MOS transistors. High voltage MOS transistors typically have very poor performances in comparison to low voltage MOS transistors.

In wait or stand-by conditions, in which signal en is low, phases PH00, PH01, PH11 and PH10 are at ground GND, whereas phases PH0_P and PH1_P are at voltage Vpp. Capacitors C00, C01, C02, C10, C11 and C12 are charged to Vpp-Vd, where Vd is the voltage drop across the related NMOS transistor connected as a diode. In effect, considering any one of the capacitors, for instance C01, in stand-by mode, node 1 is held at Vpp-Vd by transistor NCH06 and node 6 is connected to ground GND by transistor NCH00 which is on because it has the gate region coupled to Vpp and because phase PH01 is low and, therefore, its source region is at ground GND.

This means that, in stand-by mode, each capacitor C00, C01, C02 and C10, C11, C12 is pre-charged to Vpp-Vd.

In operating mode, enable signal en is high and clock signal clk is in free running condition. When it is assumed, as a starting point of the analysis, that the clock signal clk is low, then phases PH00, PH01 and PH1_P are at ground GND, while phases PH0_P, PH11 and PH10 are at voltage Vpp. In this case, the left side of the voltage multiplier circuit is in charging phase, while its right side is in discharging phase. In the left side of the voltage multiplier circuit, which is in charging phase, since phase PH0_P is at voltage Vpp, transistors PCH00 and PCH01 are off and capacitors C00, C01 and C02 are insulated from each other. Since phases PH00 and PH01 are at ground GND and node 23 is at a proper high voltage of about $V_{OUT}$+Vpp, as it will be evident hereinbelow, transistors NCH00, NCH01, NCH02, NCH03 and NCH04 are conductive or on, thereby fully charging capacitors C00, C01 and C02 to voltage Vpp. Transistor NCH08 is off in view of the fact that node 19 and node 1 are nearly at the same voltage not greater than the power supply voltage Vpp.

In the right side of the voltage multiplier circuit, which is in discharging phase, since phase PH1_P is at ground GND, transistors PCH10 and PCH11 are on, consequently connecting capacitors C10, C11 and C12 in series. As phases PH10 and PH11 are at voltage Vpp and node 19 is at a voltage not higher than Vpp, since the left side of the circuit is in charging phase, then transistors NCH10, NCH11, NCH12, NCH13 and NCH14 are off. In fact, as far as transistors NCH10 and NCH11 are concerned, it can be observed that their gate regions are coupled to Vpp, but also their source regions are coupled to Vpp, since phase PH11 is at voltage Vpp; being their drain regions at voltages greater than Vpp, these transistors are off. As far as transistors NCH12, NCH13 and NCH14 are concerned, it should be observed that node 1 and, therefore, the gate regions of transistors NCH12, NCH13 and NCH14 are at voltage not greater than Vpp, so that they are in the same conditions as transistors NCH10 and NCH11 and are off. The serially connected capacitors C10, and C12 can be discharged to the output through transistor NCH18 which is fully on, since its gate voltage is properly furnished from the last stage of the upper right portion of the circuit of FIG. 2 (see capacitor C12).

When the clock signal clk switches from low to high, in the first place the phase voltages of PH11 and PH10 are switched to low, thereby switching transistors NCH10 and NCH11 on, while the phase voltage PH1_P becomes high, thereby switching transistors PCH10 and PCH11 off. The voltage upon node 23, which tends towards the residual voltage on capacitor C12, decreases to a value not higher than voltage Vpp, so that transistors NCH02, NCH03 and NCH04 are switched off. In fact, these transistors were on thanks to the voltage on node 23, which by decreasing to a value not higher than Vpp, turns them off.

After the voltage of phase PH11 has gone low, phase PH01 becomes high, thereby pre-charging node 6 and node 3 through transistors NCH00 and NCH01 acting as diodes until they are turned off. This pre-charge improves the circuit performance, since parasitic capacitors are coupled to these nodes.

It is known, in fact, that, in MOS technology, a capacitor whose terminals can be driven to not negative voltages is typically realised by using a layer of polysilicon, as first terminal, upon an underlying thin or thick layer of gate oxide of MOS transistors, as dielectric, which is laid on a N-type diffusion region (N-well), as a second plate. A N+ diffusion, in the N– diffusion or N-well region, surrounds the polysilicon/oxide/N-well vertical structure, thereby decreasing the series resistance and allowing the contacts to the N+ well of the second terminal of the capacitor to be effected. The pn junction which forms between the N-well and the P substrate is a parasitic capacitance, associated with the capacitor, whose value is a function of the N well voltage, since substrate P is typically connected to ground. This parasitic capacitance decreases as the voltage across the reverse biased pn junction increases. Thus, the very fast pre-charging of node 6 and node 3, as well as of node 18 and node 5, before the discharging phase is started, prevents a loss of the "useful" charge of the capacitors which would be used to charge the parasitic capacitors in the first voltage range in which they have their maximum capacitance value. Lastly, all capacitors built with a thin gate oxide of the MOS transistor, rather than with a thick gate oxide, have a much lower parasitic capacitance, since the value of the parasitic capacitance is proportional to the pn junction surface area.

It can be observed now, with continuous reference to the analysis of the circuit, that the PH0_P phase voltage becomes subsequently low, thereby turning transistors PCH00 and PCH01 on, the PH00 phase voltage becomes high and node 19 rises to a voltage given by $V_{out}$ plus the voltage across capacitor CO2, which is approximately Vpp, plus the drain-source voltage of transistor NCH08 minus the source-drain voltage of transistor PCH01. The voltage on node 19 switches transistors NCH08, NCH12, NCH13 and NCH14 to a fully conductive or fully on state. At this time, the transitions in the circuit due to the clock signal clk commutations are completed.

The left side of the voltage multiplier circuit is now in discharging phase, while its right side is in charging phase. As the circuit of FIG. 2 is fully symmetrical, a perfectly analogous description of the circuit behaviour could be repeated to analyse the operation when the clock signal clk goes from high to low.

All the high voltage MOS transistors of the circuit of FIG. 2 always switch in very safe conditions so as to prevent any risk of field plate breakdown, which is a typical breakdown risk occurring in transistors switching with high voltages across them. Assuming then that the CMOS process makes insulated NMOS transistors available, they can be employed to decrease the voltage across the more stressed pn junctions, as shown in FIG. 2, where the insulated P-well regions, short circuited to their deep N-well regions, of NMOS transistors NCH07, NCH04, NCH14 and NCH17 are properly driven.

Besides decreasing the voltage stress, insulated NMOS transistors can be employed to decrease the so-called body effect, in order to drive the concerned transistors to a fully on condition to efficiently drive high currents. To this effect, the insulated P diffusions of NMOS transistors NCH08 and NCH18 are coupled to node 6 and node 18, respectively.

As it is known, an insulated NMOS transistor is typically implemented by utilising a deep N-well that contains a P-well in which the NMOS transistor is realised. The bulk of this type of NMOS transistor is insulated from the P-substrate by the deep N well and can be driven to different voltages, provided that all pn junctions be never forwardly biased. For positive voltages, the P well can be short circuited to the deep N well and can rise to a positive voltage not higher than the drain or source voltage of the insulated NMOS transistor. However, insulated NMOS transistors are mainly designed to handle negative voltages. As a matter of fact, by coupling the deep N well to voltage Vpp or to ground GND, the source and drain regions of an insulated NMOS transistor can be driven to negative voltages, provided that such voltages be not lower than the P well voltage.

Some of the process steps aimed at building an insulated NMOS transistor can also be utilised to build a NPN type bipolar transistor. The collector of the NPN transistor is made by a deep N well that contains a P well, as base region, while the emitter is made by a N+ diffusion within the P well. Due to the high sheet resistance of the deep N well, this NPN type transistor exhibits a high collector resistance. When the collector and base terminals are short circuited in order to accomplish the diode function, as the current increases, the voltage across the base-collector junction increases, until the junction becomes forwardly biased, thereby turning the PNP type parasitic transistor on. As it is known to those skilled in the art, the PNP type parasitic transistor is made by the P well, the deep N well and by the P-substrate, which act as emitter, base and collector, respectively. Of course, when this PNP type parasitic transistor turns on, a relevant loss of current to ground occurs which severely impairs the diode functionality.

As concerns the details of the circuit, it can be observed that the last switch of each section of the circuit is realised by means of an insulated NMOS transistor, NCH08 and NCH18, having its gate region coupled to the upper terminal of the capacitor of the last stage, its drain region coupled to the upper terminal of the capacitor of the last-but-one stage, its source region coupled to the output of the voltage, multiplier circuit and its deep N diffusion (deep N well) and insulated P diffusion (iso P well) regions short circuited to each other and coupled to the lower terminal of the capacitor of the last-but-one stage.

Figure 1:
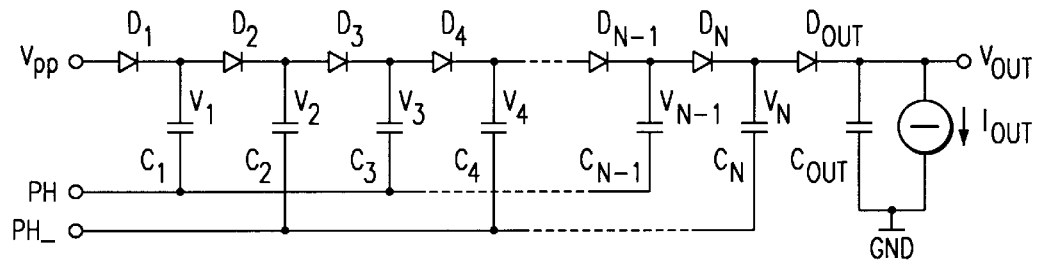
FIG. 1 shows a charge pump circuit according to conventional technology.

Unlike the circuit of FIG. 1, in the novel voltage multiplier scheme according to this invention, the maximum voltage across each capacitor is only equal to the power supply voltage Vpp. This observation is very important from an efficient silicon area usage view point when, as it occurs in many cases, the capacitor dielectric is made by the MOS transistor gate oxide. In fact, the maximum allowed voltage across the gate oxide of a MOS transistor depends on the thickness of the gate oxide itself. Low voltage MOS transistors are made with a thin gate oxide which has a very high capacitance per unit area. In contrast, high voltage MOS transistors are made with thick gate oxide, because they have to withstand high voltages; however, a thick gate oxide, compared to a thin gate oxide, has a much lower capacitance per unit area.

The voltage multiplier according to the scheme of this invention allows a very thin gate oxide to be used for realising the capacitors and this is a really noticeable advantage in terms of silicon area usage. In some effective embodiments of this invention (Epic3-Flash merged technology (33M12)), the thin gate oxide of the MOS transistor has a thickness of 8 nm and a capacitance per unit area of about 3.8 FF/$\mu$m$^2$, the thick gate oxide of the MOS transistor has a thickness of 21 nm and a capacitance per unit area of 1.6 FF/$\mu$m$^2$. The silicon area needed to build the same capacitor is more than twice larger if a thick MOS gate oxide is used instead of a thin MOS gate oxide.

Figure 3:
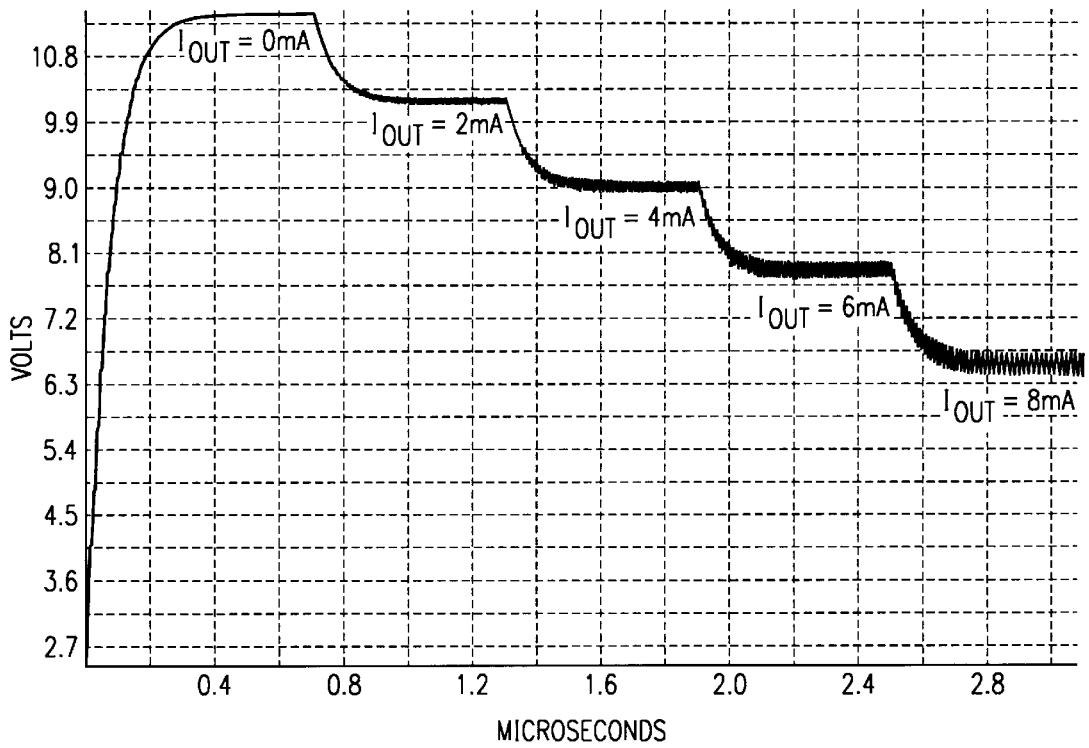
FIG. 3 shows the output voltage $V_{OUT}$ behaviour in the charge pump circuit of FIG. 2.

The charge pump circuit of FIG. 2 has been simulated by utilising Epic3-Flash merged technology (33M12) SPICE models, a clock period of 20 ns and a power supply voltage of 4 volts, furnished by a high current voltage regulator which is integrated with the embedded Flash EEPROM memory. The parasitic capacitance has been taken into account in the SPICE simulation by connecting an additional capacitor between the bottom plate of each capacitor and ground. Each parasitic capacitance has been estimated at 1.2% of the capacitor value which it is associated with. Furthermore, an ideal current source $I_{OUT}$ has been inserted between the output and ground in order to emulate the load current. The waveform of the output voltage $V_{OUT}$ is shown in FIG. 3. It shows that the high voltage charge pump of FIG. 2 is equivalent to an ideal voltage generator of 11.4 V serially connected to a resistor of 600 ohms. A voltage multiplier based upon this novel scheme is equivalent to an ideal voltage generator Vo with a serially connected resistor Ro the values of which, in the range of interest and with good approximation, are proportional to Vpp and to the clock period T, respectively, that is to say Vo$\cong\alpha$*Vpp and Ro$\cong\beta$* T. The $\alpha$ and $\beta$ coefficients depend on the circuit only. As it has been shown by the SPICE simulation, for an output current in the range 2 mA to 8 mA, the power efficiency is practically constant and equal to 48%, which is a very high value for a charge pump circuit.

The preferred embodiment has been described and some modifications have been suggested above, but it should be understood that those skilled in the art can make modifications and changes to the components without departing from the scope of this invention as defined in the attached claims.

It is claimed:

1. A voltage multiplier circuit for integrated circuits, comprising two mirrored sections driven by control signals (PH00, PH01, PH0_P; PH10, PH11, PH1_P) generated by a logic circuitry which receives, as input signals, an enable signal (en) and a clock signal (clk), wherein each mirrored section includes N stages and each stage comprises a capacitor (C00, C01, C02; C10, C11, C12) having a lower terminal and an upper terminal, the lower terminal is connected to a first switch (INV0, NCH00, NCH01; INV1, NCH10, NCH11) that, in closed condition, couples the lower terminal of the capacitor to ground (GND), said lower terminal of the capacitor being additionally connected to a second two-terminal switch (INV0, PCH00, PCH01; INV1, PCH10, PCH11) that, in closed condition, couples the lower terminal of the capacitor to a power supply voltage (Vpp), as far as the first stage is concerned, or to the upper terminal of the capacitor of the previous stage, the upper terminal of the capacitor is connected to a third switch (NCH02, NCH03, NCH04; NCH12, NCH13, NCH14) that, in closed condition, couples the upper terminal of the capacitor to the power supply voltage (Vpp), the upper terminal of the capacitor (C01; C11) of the last-but-one stage is connected to a last two-terminal switch (NCH08; NCH18) that, in closed condition, couples the upper terminal of the capacitor of the last-but-one stage to the output of the voltage multiplier; said control signals directly or indirectly drive said switches such that, when the voltage multiplier is enabled (en=1), at a rate determined by said clock signal (clk), each mirrored section in alternating times is switched over from a charging phase to a discharging phase, so that while a mirrored section is in charging phase, the other one is in discharging phase and vice versa; when a mirrored section of the circuit is in charging phase, the last switch (NCH08; NCH18) and all second switches thereof (INV0, PCH00, PCH01; INV1, PCH10, PCH11) are in open condition, while its first (INV0, NCH00, NCH01; INV1, NCH10, NCH11) and its third switches (NCH02, NCH03, NCH04; NCH12, NCH13, NCH14) are in closed condition, so that all capacitors of this circuit section are parallel connected between the power supply voltage (Vpp) and ground (GND) and are charged up to said power supply voltage (Vpp); when a mirrored section of the circuit is in discharging phase, all its first (INV0, NCH00, NCH01; INV1, NCH10, NCH11) and third switches (NCH02, NCH03, NCH04; NCH12, NCH13, NCH14) are in open condition, while its last switch (NCH08; NCH18) and all its second switches (INV0, PCH00, PCH01; INV1, PCH10, PCH11) are in closed condition, so that all capacitors are serially connected with one another, the lower terminal of the capacitor (C00; C10) of the first stage being connected to the power supply voltage (Vpp) and the upper terminal of the capacitor of the last-but-one stage being connected to the output of the voltage multiplier; when the voltage multiplier is disabled (en=0), both mirrored sections of the circuit are in charging phase.

2. A voltage multiplier circuit for integrated circuits according to claim 1, wherein said two mirrored circuit sections are driven by a first and a second control signals (PH01 and PH0_P; PH11 and PH1_P) respectively, having opposite polarities; when the mirrored section is in charging phase, said first control signal is at ground (GND), while said second control signal is at the power supply voltage (Vpp); when the mirrored section is in discharging phase, said first control signal is at the power supply voltage (Vpp), while said second control signal is at ground (GND).

3. A voltage multiplier circuit for integrated circuits according to claim 1 wherein the first and second switches of the first stage of each mirrored section are realised by means of conventional CMOS inverters (INV0, INV1) so that said first switch is realized by means of a N-channel MOS transistor, having the source region connected to ground, the drain region connected to the lower terminal of the first stage capacitor (C00, C10) and the gate region connected to the line of said second control signal (PH0_P, PH1_P), said second switch is realised by a P-channel MOS transistor having the source region and N well in which the transistor is realized connected to the power supply voltage (Vpp), the drain region connected to the lower terminal of the first stage capacitor (C00, C10) and the gate region connected to the line of said second control signal (PH0_P, PH1_P).

4. A voltage multiplier circuit for integrated circuits according to claim 1 wherein all said first switches, except for the ones of the first stage of both mirrored sections, are realized by means of N-channel MOS transistors (NCH00, NCH01, NCH10, NCH11) having their source region connected to the line of said first control signal (PH01, PH11), their drain region connected to the lower terminal of the capacitor and their gate region connected to the power supply voltage (Vpp).

5. A voltage multiplier circuit for integrated circuits according to claim 1 wherein all said second switches (PCH00, PCH01, PCH10, PCH11), except for the ones of the first stage of both mirrored sections, are realised by means of P-channel MOS transistors having their source region and the N well, in which the transistor is realised, connected to the upper terminal of the capacitor of the previous stage, their drain region connected to the lower terminal of the capacitor of their own stage and their gate region connected to the line of said second control signal (PH0_P, PH1_P).

6. A voltage multiplier circuit for integrated circuits according to claim 1, wherein all said third switches (NCH02, NCH03, NCH04, NCH12, NCH13, NCH14) are realised by means of N-channel MOS transistors, having their source region connected to the upper terminal of the capacitor, their drain region connected to the power supply voltage (Vpp) and their gate region connected to the upper terminal of one of the capacitors (C02, C12) of the other mirrored section of the circuit so as to enable a suitable voltage to be picked off from the discharging section for application to the gate region of said MOS transistors in order to turn them fully on when they emulate a closed switch.

7. A voltage multiplier circuit for integrated circuits according to claim 1 wherein each stage further includes a diode (NCH05, NCH06, NCH07; NCH15, NCH16, NCH17) having its anode connected to the power supply voltage (Vpp) and its cathode connected to the upper terminal of the capacitor in order to guarantee a pre-charge of the capacitors when the voltage multiplier is disabled (en=0), being said third switches in open condition due to the fact that they are realised by means of N-channel MOS transistors having their gate regions at a voltage not sufficient to turn them on because, since the voltage multiplier is disabled, both mirrored sections are in charging phase.

8. A voltage multiplier circuit for integrated circuits according to claim 1, wherein said last switch (NCH08; NCH18) is realized by means of a NMOS transistor, having its gate region coupled to the upper terminal of the capacitor (C02; C12) of the last stage, its drain region coupled to the upper terminal of the capacitor (C01; C11) of the last-but-one stage and its source region coupled to the output of the voltage multiplier circuit.

9. A voltage multiplier circuit for integrated circuits according to claim 2, wherein the first and second switches of the first stage of each mirrored section are realized by means of conventional CMOS inverters (INV0, INV1) so that said first switch is realized by means of a N-channel MOS transistor, having the source region connected to ground, the drain region connected to the lower terminal of the first stage capacitor (C00, C10) and the gate region connected to the line of said second control signal (PH0_P, PH1_P), said second switch is realised by a P-channel MOS transistor having the source region and a N well in which the transistor is realized connected to the power supply voltage (Vpp), the drain region connected to the lower terminal of the first stage capacitor (C00, C10) and the gate region connected to the line of said second control signal (PH0_P, PH1_P).

10. A voltage multiplier circuit for integrated circuits according to claim 2, wherein all said first switches, except for the ones of the first stage of both mirrored sections, are realized by means of N-channel MOS transistors (NCH00, NCH01, NCH10, NCH11) having their source region connected to the line of said first control signal (PH01, PH11), their drain region connected to the lower terminal of the capacitor and their gate region connected to the power supply voltage (Vpp).

11. A voltage multiplier circuit for integrated circuits according to claim 2, wherein all said second switches (PCH00, PCH01, PCH10, PCH11), except for the ones of the first stage of both mirrored sections, are realized by means of P-channel MOS transistors having their source region and a N well, in which the transistor is realised, connected to the upper terminal of the capacitor of the previous stage, their drain region connected to the lower terminal of the capacitor of their own stage and their gate region connected to the line of said second control signal (PH0_P, PH1_P).

12. A voltage multiplier circuit for integrated circuits according to claim 6, wherein each stage further includes a diode (NCH05, NCH06, NCH07; NCH15, NCH16, NCH17) having its anode connected to the power supply voltage (Vpp) and its cathode connected to the upper terminal of the capacitor in order to guarantee a pre-charge of the capacitors when the voltage multiplier is disabled (en= 0), said switches being in open condition due to the fact that they are realized by means of N-channel MOS transistors having their gate regions at a voltage not sufficient to turn them on because, since the voltage multiplier is disabled, both mirrored sections are in charging phase.

13. A voltage multiplier circuit for integrated circuits according to claim 7, wherein said diode (NCH05, NCH06, NCH07, NCH15, NCH16, NCH17) are realised by means of N-channel MOS transistors, having their source region connected to the upper terminal of the capacitor and their drain and gate regions both connected to the power supply voltage (Vpp).

14. A voltage multiplier circuit for integrated circuits according to claim 8, wherein said N-channel MOS transistors are of insulated type, having their deep N well and insulated P well regions short-circuited to each other and coupled to the lower terminal of the capacitor (C01; C11) of the last-but-one stage.

15. A voltage multiplier circuit for integrated circuits according to claim 7, wherein said N-channel MOS transistors are of insulated type, having their deep N well and insulated P well regions short-circuited to each other and coupled to the lower terminal of the capacitor (C01; C11) of the last-but-one stage.

16. A voltage multiplier circuit for integrated circuits according to claim 1, wherein said last switch (NCH08; NCH18) is realized by means of a diode having its anode coupled to the upper terminal of the capacitor (C02; C12) of the last stage, its cathode coupled to the output of the voltage multiplier circuit.

17. A voltage multiplier circuit for integrated circuits according to claim 16, wherein said diode is realized by means of a bipolar NPN transistor connected as a diode having its base and collector coupled to each other and operating as an anode and having its emitter operating as cathode.

* * * * *